United States Patent [19]
Heck

[11] Patent Number: 5,108,696
[45] Date of Patent: Apr. 28, 1992

[54] DEVICE FOR CONTROLLED COMBUSTION OF AN IGNITABLE HYDROGEN/AIR MIXTURE IN A NUCLEAR POWER PLANT

[75] Inventor: Reinhard Heck, Hanau, Fed. Rep. of Germany

[73] Assignee: Siemens Aktiengesellschaft, Munich, Fed. Rep. of Germany

[21] Appl. No.: 615,465

[22] Filed: Nov. 19, 1990

Related U.S. Application Data

[63] Continuation of PCT/EP89/00530, May 16, 1989.

[30] Foreign Application Priority Data

May 17, 1988 [DE] Fed. Rep. of Germany ....... 3816711

[51] Int. Cl.⁵ .............................................. G21C 9/00
[52] U.S. Cl. .................................... 376/300; 361/253
[58] Field of Search ......... 376/300, 301, 283; 423/580; 431/27, 258, 264; 361/257, 253

[56] References Cited

U.S. PATENT DOCUMENTS

| 4,381,913 | 5/1983 | Craig et al. ...................... 431/264 |
| 4,425,495 | 1/1984 | Cake et al. ...................... 219/267 |
| 4,891,181 | 1/1990 | Heck .................................. 376/300 |
| 4,911,879 | 3/1990 | Heck et al. ....................... 376/301 |

FOREIGN PATENT DOCUMENTS

| 0233564 | 8/1987 | European Pat. Off. . |
| 0289907 | 11/1988 | European Pat. Off. . |
| 2016800 | 10/1970 | Fed. Rep. of Germany . |
| 2239952 | 4/1973 | Fed. Rep. of Germany . |
| 3004677 | 8/1981 | Fed. Rep. of Germany . |
| 3004677 | 5/1984 | Fed. Rep. of Germany . |
| 3705193 | 8/1988 | Fed. Rep. of Germany . |

*Primary Examiner*—Brooks H. Hunt
*Assistant Examiner*—Chrisman D. Carroll
*Attorney, Agent, or Firm*—Herbert L. Lerner; Laurence A. Greenberg

[57] ABSTRACT

A device for controlled combustion of an ignitable hydrogen/air mixture in a gas mixture of a nuclear power plant, especially in a containment thereof, includes a spark igniter for tripping an ignition process. At least one ignition source is connected to the spark igniter. The ignition source has a self-sufficient energy storage device. The ignition source has at least one first trip element connected between the spark igniter and the energy storage device for responding as a function of temperature to trip the ignition process, and at least one second trip element connected between the spark igniter and the energy storage device for responding as a function of pressure to trip the ignition process. The at least one first trip element is in thermally conductive contact and the at least one second trip element is in pressure-transmitting contact with the gas mixture to be monitored. The energy storage device discharges to the spark igniter if one of the trip elements responds. The spark igniter creates ignition sparks being repeated at intervals during an accident extending over a relatively long period of time.

15 Claims, 5 Drawing Sheets

DEVICE FOR CONTROLLED COMBUSTION OF AN IGNITABLE HYDROGEN/AIR MIXTURE IN A NUCLEAR POWER PLANT

CROSS-REFERENCE TO RELATED APPLICATION

This application is a Continuation of International application Ser. No. PCT/EP89/00530, filed May 16, 1989.

The invention relates to a device for controlled combustion of a hydrogen/air mixture contained in the gas mixture in a nuclear power plant, in particular in the containment of nuclear reactors, having at least one ignition source to which a spark igniter is connected.

During a major accident, or afterward, an ignitable hydrogen/air mixture can be created in the containment shell of a light water reactor. The term "major accident" is understood to be the highly improbable case, in modern light water reactors, of a core meltdown. The Three Mile Island accident in the United States in 1979 reached a preliminary stage of core meltdown. The superheating of the fuel assemblies that occurred in the upper region of the reactor core came to stop, and a large amount of hydrogen gas ($H_2$) that was trapped in the containment along with air could not be eliminated without endangering the surrounding areas. Uncontrollable ignition of such a gas mixture, with a high hydrogen concentration, would severely strain the reactor containment shell as a result of the pressure and temperature of an explosion. Purposeful early ignition of the mixture of $H_2$ and air at a low hydrogen concentration minimizes such strains and prevents rupture of the containment shell.

Proposals have long been made as to how to eliminate undesirable quantities of hydrogen in the containment. German Published, Non-Prosecuted Application DE-OS 2 239 952 discloses a device (of a different generic type) with a recombinator disposed in the containment for combining hydrogen ($H_2$) and oxygen ($O_2$) into water. The two gases reacting with one another are heated to a suitable reaction temperature of at least 620° C., and preferably 760° C. Such a recombinator requires a relatively large amount of space.

A more-compact gas combustion system for nuclear reactors has therefore already been developed, for instance as described in German Published, Non-Prosecuted Application DE-OS 2 016 800, which is called a "stopper burner". In that case, $H_2$ and $O_2$ are carried through sintered porous copper plates, through which cooling tubes pass. The two gases combust on and in the porous copper plates. The water-cooled "stopper burner" requires at least one ignition source and it is particularly suited to boiling water nuclear reactor plants, in which hydrogen that must be eliminated is produced not only in an accident but during normal operation, as well, by radiolysis. German Patent DE-PS 30 04 677 C2 discloses the disposition of igniters in all regions of the containment shell of a nuclear reactor in which hydrogen can be present The igniters are disposed in a grid pattern having a grid spacing that depends on the potential threat of the particular region. Glow plugs, spark plugs or catalytic igniters are used as igniters in that case. Catalytic igniters are subject to soiling and therefore to the uncertainty as to whether or not they will actually work in an emergency. Glow plugs and spark plugs require a supply of energy through a cable. Although the energy supply is provided as a rule from an emergency power supply, such a power supply can fail in that kind of accident.

It is accordingly an object of the invention to provide a device for controlled combustion of an ignitable hydrogen/air mixture in a nuclear power plant, which overcomes the hereinafore-mentioned disadvantages of the heretofore-known devices of this general type and which does so in such a way that the formation of relatively large volumes of ignitable hydrogen/air mixtures is highly reliably prevented. A further object is to disclose an operationally reliably, pressure-proof chassis and housing construction for the device, in which the ignition source along with the energy storage device, the trip elements and the connecting electrical and mechanical lines can be accommodated in a pressure-proof, high-voltage-proof manner.

With the foregoing and other objects in view there is provided, in accordance with the invention, a device for controlled combustion of an ignitable hydrogen/air mixture in a gas mixture in a nuclear power plant, especially in a containment thereof, comprising a spark igniter for tripping an ignition process; at least one ignition source connected to the spark igniter; the ignition source having a self-sufficient energy storage device; the ignition source having at least one first trip element connected between the spark igniter and the energy storage device for responding as a function of temperature to trip the ignition process, and at least one second trip element connected between the spark igniter and the energy storage device for responding as a function of pressure to trip the ignition process, the at least one first trip element being in thermally conductive contact and the at least one second trip element being in pressure-transmitting contact with the gas mixture to be monitored; the energy storage device discharging to the spark igniter if only one or at least one of the trip elements responds, and the spark igniter creating ignition sparks being repeated at intervals during an accident extending over a relatively long period of time.

The term "self-sufficient" is understood to mean that the energy storage device requires no supply lines, whether in the form of cables or in the form of other energy transporting lines. It is therefore independent of any remote energy storage device or energy source. Instead, the energy storing means or energy source is directly associated with the ignition source.

In accordance with another feature of the invention, the spark igniter has an ignition electrode at relatively high potential and a counter-electrode at ground potential being disposed opposite the ignition electrode, the energy storage device is a long-term battery configuration, and there is provided a pressure-proof housing having a solid bottom plate with inner and outer surfaces, the at least one first trip element being mounted in thermally conductive contact with the inner surface of the bottom plate, the bottom plate having a high-voltage duct formed therein for the ignition electrode, a support device secured to the inner surface of the bottom plate, an electrical/electronic circuit for generating high-voltage ignition sparks if one of the trip elements respond, the electrical/electronic circuit, the long-term battery configuration and the at least one second trip element being secured on the support device, and a pressure measuring line being connected to the at least one second trip element and penetrating the housing in a pressure-proof manner.

In accordance with a further feature of the invention, the ignition electrodes have a sparking distance therebetween, and there are provided retaining bodies on which both of the ignition electrodes are retained for adjusting the sparking distance and spacing the ignition electrodes apart from the bottom plate.

In accordance with an added feature of the invention, the pressure measuring line penetrates the bottom plate.

In accordance with an additional feature of the invention, there is provided a high-voltage insulator body being sealingly inserted into the bottom plate, the ignition electrodes having pin or needle-like shapes, the retaining body for the high-voltage ignition electrode being a solid pin centrally penetrating the high-voltage insulator body and having a free downwardly pointing end, and an adjustable receptacle disposed on the free downwardly pointing end for the high-voltage ignition electrode.

In accordance with yet another feature of the invention, there is provided a stay bolt being screwed into the lower surface of the bottom plate and having a free end, and an adjustable receptacle disposed on the free end of the stay bolt for retaining the counter-electrode.

In accordance with yet a further feature of the invention, the sparking distance has a given minimum, and the ignition electrodes are pin or needle-like, have tips facing each other at the given minimum distance, have other ends, and each extend at an incline relative to the horizontal as viewed from the electrode tips to the other ends.

In accordance with yet an added feature of the invention, there is provided an electrode protection chamber disposed underneath the bottom plate and immediately surrounding the ignition electrodes, and a sheet-metal jacket surrounding the electrode protection chamber for protection against wind and splashing water.

In accordance with yet an additional feature of the invention, the sheet-metal jacket has a downwardly pointing opening formed therein, and a relatively large-mesh grid covering the downwardly pointing opening for shielding against touching while not impairing an ignition process.

In accordance with again another feature of the invention, the grid is formed of a fire-proof insulating material.

In accordance with again a further feature of the invention, there is provided a pressure-proof encapsulation for the housing having a pressure-proof steel hood with a hood opening formed therein, and an annular flange disposed in the vicinity of the hood opening and the solid bottom plate, the annular flange and the bottom plate being flanged together in a pressure-proof manner.

In accordance with again an added feature of the invention, there is provided a third trip element for responding magnetically to discharge the energy storage device to the spark igniter.

In accordance with again an additional feature of the invention, the energy storage device is a battery, the trip elements have contact paths, and there is provided a reed contact path being connected electrically parallel to the contact paths, the reed contact path having a tubule disposed on the inner surface of the bottom plate for checking functioning of the at least one ignition source and charge status of the battery from the outside by magnet-actuated closure of the reed contact path.

In accordance with a concomitant feature of the invention, the supporting apparatus has stay bolts, a table panel configuration retained on and spaced apart from the bottom plate by the stay bolts, a lower table panel being formed of insulating material and having a lower surface, the electrical/electronic circuit has a structural unit secured on the lower surface of the lower table panel, and an upper table panel formed of metal on which the battery configuration and the at least one second trip element are secured.

According to a preferred embodiment, the energy storage device is the dry-cell battery or dry-cell battery configuration of a high-voltage ignition unit, with a spring-loaded or electronic switch in the current circuit of the dry-cell battery, along with a high-voltage module, charge capacitor and spark igniter. This electronic or spring loaded switch, which will be referred to below as a trip switch, has at least two contact paths that are connected parallel to one another. One contact path is actuatable by the sensor of at least one first trip element, and the other contact path is actuatable by the sensor of at least one second trip element. A trip element includes at least one contact path and at least one sensor controlling that path. It is particularly advantageous for the trip switch to have a further parallel-connected contact path, which may be a reed contact path, that at the same time includes the sensor which is dependent on a magnetic field. This weak contact path can be closed by moving a test magnet toward the device from the outside, and thus a sparkover at the spark igniter can be artificially produced, so that proof of proper functioning of the ignition source or that the charge state of the battery is still adequate, is also obtained. According to another preferred embodiment, a lithium accumulator is used as the battery or battery configuration. Such a device operates satisfactorily, or in other words properly, over a period of approximately 4 to 5 days, even at elevated temperatures on the order of 200° C.

The advantages attainable with the invention are above all that redundancy and the reliability of response of the device are increased considerably. If an ignitable $H_2$/air mixture forms, it entails a temperature increase, a pressure increase, or both. Since the device according to the invention has at least two trip elements, specifically trip elements that respond as a function of pressure and temperature, it is guaranteed that at least one signal will cause tripping.

This may be either a temperature signal or a pressure signal. Reliability in the event of failure of one trip element is also increased. The intrinsically high reliability of the device according to the invention can be increased even further if at least two sensors with associated contact paths are provided per trip element, so that at least two sensors respond to one physical variable (in particular, temperature) and at least two further sensors of the other trip element respond to the other physical variable (in particular, pressure). The result is a one-out-of-four tripping condition. A fourth type of trip element (if a reed contact path is present) could include at least one gas analyzer, which responds to the $H_2$ concentration of the hydrogen/air mixture monitored by the device, thus furnishing one additional physical variable as a criterion for tripping ignition processes.

Other features which are considered as characteristic for the invention are set forth in the appended claims.

Although the invention is illustrated and described herein as embodied in a device for controlled combustion of an ignitable hydrogen/air mixture in a nuclear power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
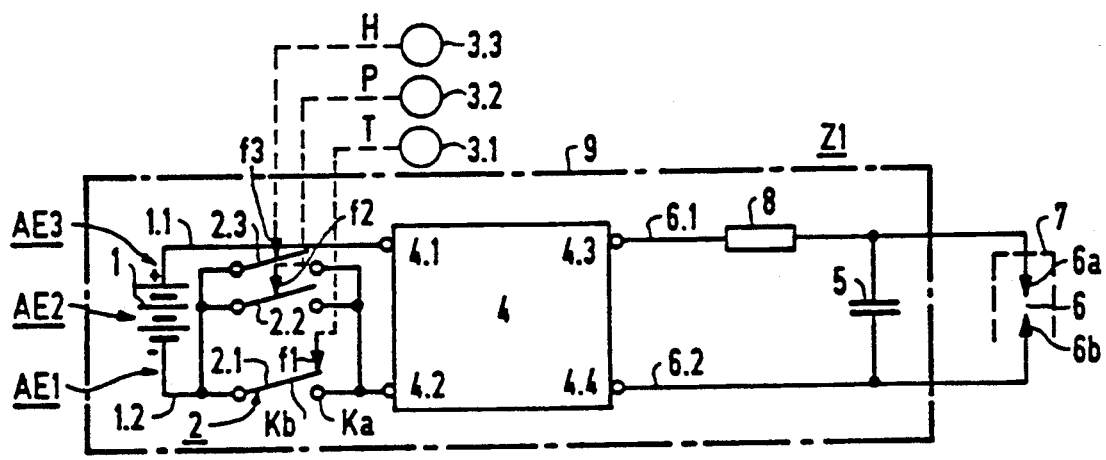
FIG. 1 is a schematic and block circuit diagram of a basic embodiment of a simple device according to the invention having an ignition source including a dry-cell battery, a high-voltage module and a spark gap, with the device having three trip elements that respond independently of one another.

Referring now in detail to the figures of the drawings in conjunction with which exemplary embodiments, further advantages and the mode of operation of the invention are described and first, particularly, to FIG. 1 thereof, there is seen a positive line 1.1 and a negative line 1.2 of a dry-cell battery 1 which are connected to input terminals 4.1, 4.2 of a high-voltage module 4. A multipole switch 2 which is incorporated in the negative line 1.2 has three contact paths 2.1, 2.2 and 2.3, which are parallel to one another in the illustrated embodiment. Arrows f1, f2 and f3 that indicate action, express the fact that the contact paths, which are shown in the open position, can be closed by influencing variables acting upon them from outside, as soon as these variables exceed an adjustable limit value. In this example, f1 represents a variable analogous to the temperature T of the gas mixture to be monitored in the containment of a nuclear reactor system; f2 represents a variable analogous to the pressure P of this gas mixture; and f3 represents a variable analogous to the magnetic field H of a test magnet. A contact path 2.3, which is constructed as a reed contact, can be arbitrarily closed for test purposes, in other words to check the charge status of the dry-cell battery 1 and the function of a spark igniter or high-tension fuse 6, using the magnetic field H. Each of the contact paths 2.1 through 2.3 has fixed contacts $K_a$ and movable contacts $K_b$. These may be electromechanical switches, which are spring-loaded in the opening direction and are actuated in the closing direction whenever the influencing variables f1–f3 exceed the aforementioned limit value. The contact paths 2.1–2.3 may also be constructed as electronic switches. Schematically illustrated sensors 3.1 (temperature sensor), 3.2 (pressure sensor) and 3.3 (reed contact path) serve as measured value pickups that are dependent on temperature, pressure, and magnetic field. The lines of action shown in broken lines indicate that if the aforementioned limit values are exceeded, analog contact closing influencing variables f1 or f2 or f3 are generated. A first trip or triggering element AE1 includes the temperature sensor 3.1 and the contact path 2.1; a second trip or triggering element AE2 includes the pressure sensor 3.2 and the contact path 2.2; and a third trip or triggering element AE3 includes the magnetic field-dependent sensor 3.3 and the contact path 2.3.

Figure 3:
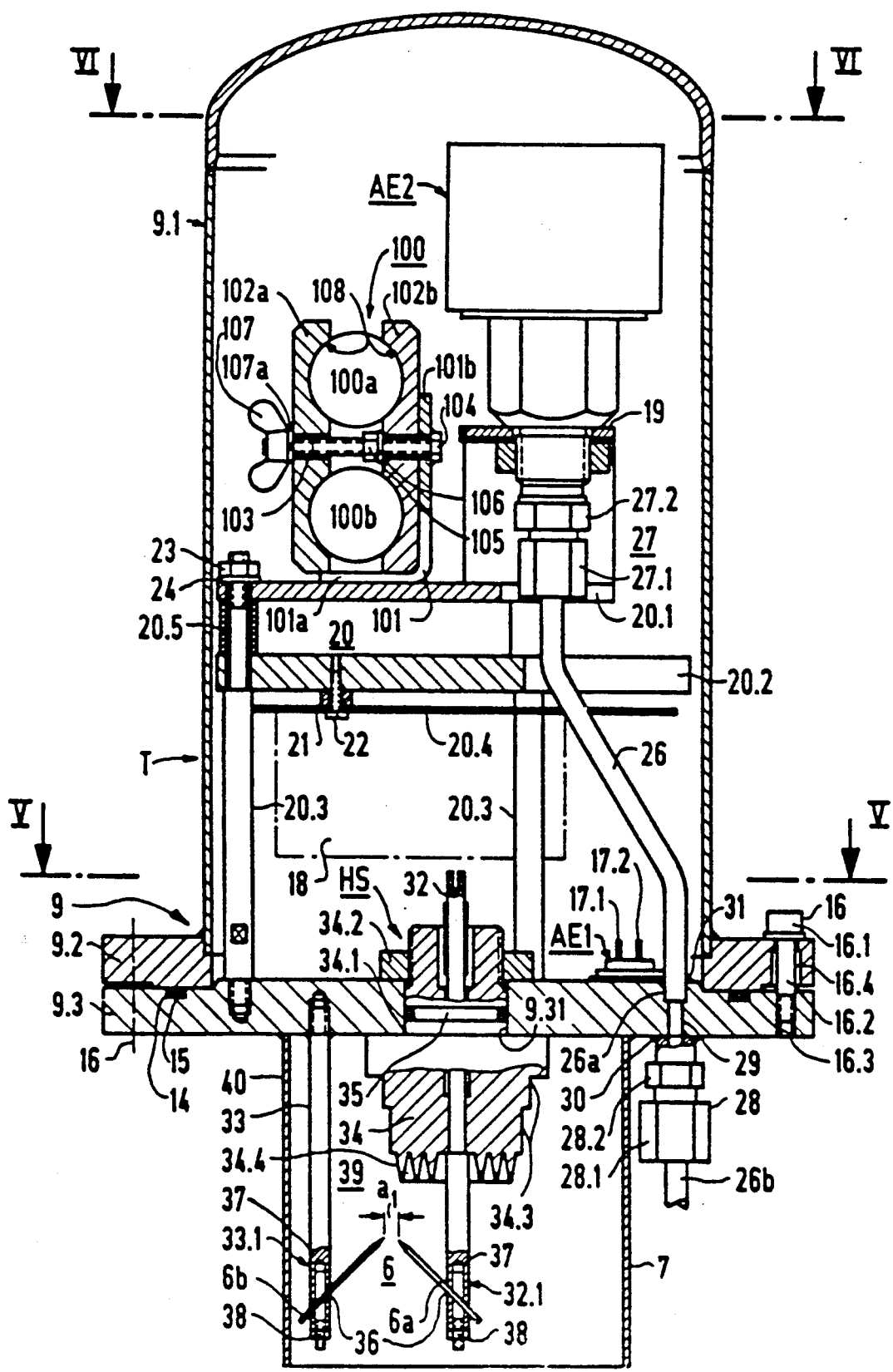
FIG. 3 is a diagrammatic, longitudinal-sectional view of an electrical/mechanical embodiment of the device of FIG. 2.

Ignition electrodes 6a–6b defining a spark gap of the electric spark igniter 6 are connected through respective electrical high-voltage lines 6.1 and 6.2 to positive and negative output terminals 4.3 and 4.4 of the high-voltage module 4. A charge resistor 8 is disposed in the line 6.1, and the two lines 6.1, 6.2 are connected to one another between the charge resistor 8 and the ignition electrodes 6a–6b defining the spark gap by a charge capacitor 5. The spark igniter 6 is provided with a gas-permeable splash protector 7. As will be appreciated, all of the components of this ignition source, which are identified as a whole by reference symbol Z1, except for the spark igniter 6, are accommodated inside a metal housing 9 in such a manner as to be protected against moisture, pressure and temperature, and are wired therein. The wall of the metal housing 9 is penetrated only by the electrical supply lines of the spark igniter 6 and by a pressure measuring line, which is not shown in FIG. 1 but is explained below in conjunction with FIG. 3.

In the tripping situation, that is, in the event that the temperature of the gas mixture to be monitored is excessively high, an adjustable temperature limit value is exceeded. The trip element AE1 that responds as a function of temperature is then made to respond as indicated by the arrow f1. In a preferable embodiment, this is a thermal switch which is not shown in FIG. 1. The contact path 2.1, which can accordingly be actuated by a thermal switch, is closed, and the high-voltage module 4 is supplied with direct current by the dry-cell battery 1. The high voltage generated in this high-voltage module 4 is picked up at its terminals 4.3, 4.4, and due to the RC combination 8, 5, it generates an igniting high voltage, having a sawtooth pattern, at the two ignition electrodes 6a–6b defining the spark gap. The chronological spacing or cycling time of the ignition pulse trains can amount to several minutes, because after an intermittently performed "torching" or combustion of a volume of hydrogen, a certain amount of time elapses before an ignitable mixture is again present. The battery 1 has enough capacity to permit the cycling or intermittently operated ignition processes to extend over several days. The high-voltage module 4 is preferably a electronic component, which transforms the direct voltage from the low-voltage dry-cell battery to the required high or sparking voltage. It simultaneously converts the direct current into a transformable pulsed current. In principle, it would also be possible to provide a mechanical circuit breaker in the ignition source Z1 of FIG. 1, instead of an electronic switch or circuit breaker (such as a transistor) although the electronic version is given preference.

Figure 2:
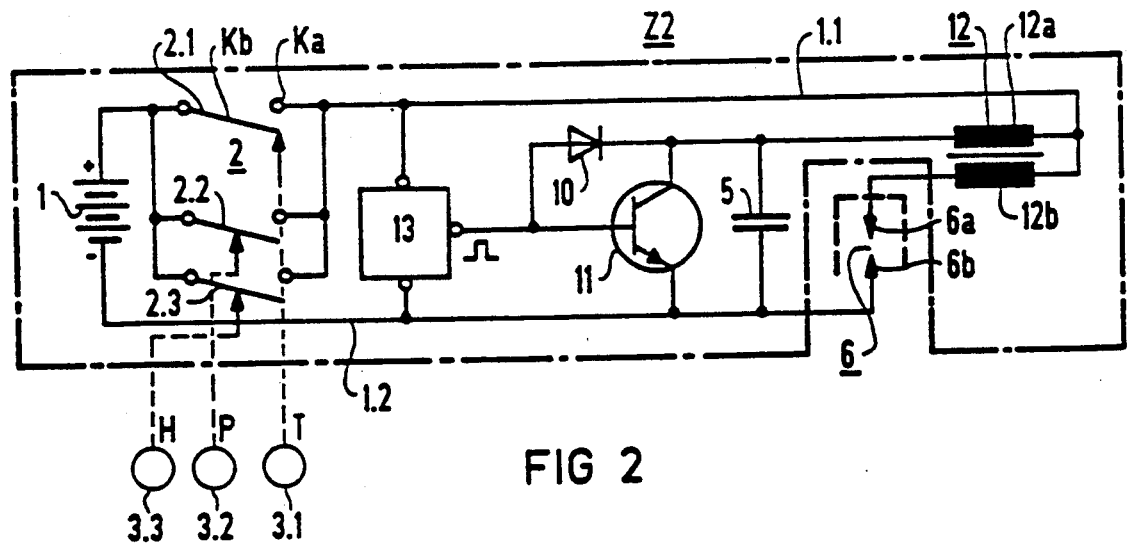
FIG. 2 is a schematic and block circuit diagram of a variant of the device of FIG. 1, with the circuit diagram being shown in greater detail and having a clock generator, a protective diode and a high-voltage ignition transformer.

In the ignition source Z2 of FIG. 2, some switch elements of the high-voltage module are shown in greater detail. In the event of the closure of one of the contact paths 2.1–2.3 of the switch 2, a clock generator 13 emits a pulse train to the base of a high-voltage transistor 11 connected downstream thereof. A protective diode 10 is connected parallel to the base-to-collector path of this transistor, whereas its emitter is connected to the negative line 1.2. The charge capacitor 5 is connected between the emitter and the collector. A primary winding 12a of an ignition transformer 12 is incorporated into the path between the positive line 1.1 of the dry-cell battery 1 and the collector. With the transistor 11 conducting, this primary winding has battery current flowing through it, by way of the emitter-to-collector path. In this process it stores inductive energy. If the transistor 11 is blocked by base biasing, then a high voltage or igniting voltage is induced in a secondary winding 12b. This causes discharges in the form of igniting sparks at the spark gap of the spark igniter 6. The transistor 11 functions similarly to the transistor of a transistorized motor vehicle ignition system.

The ignition sources Z1 of FIG. 1 and Z2 of FIG. 2 described above serve the purpose of controlled combustion of ignitable hydrogen/air mixtures in a nuclear power plant. In particular, "nuclear power plant" is understood to mean nuclear reactor systems having water-cooled nuclear reactors, that is pressurized water, boiling water or heavy water nuclear reactor systems which have a containment, inside a pressure-proof steel and/or concrete shell, in which an ignitable hydrogen/air mixture can occur in the event of an accident. This mixture is made to combust purposefully by using ignition sources Z1 and/or Z2, which are distributed inside the containment. The basic concept can be understood from FIGS. 1 and 2 as follows:

a) The ignition source is provided with self-sufficient energy storage device in the form of the battery 1, having a charge status which can be checked at regular time intervals. This energy storage device is preferably a dry-cell battery, which functions reliably up to a temperature level of approximately 200° C. So-called lithium accumulators are particularly suitable for this purpose.

b) In order to trip the ignition process, there are provided not only at least one first trip element AE1 responding as a function of temperature, but also at least one second trip element AE2, responding as a function of pressure. Through the use of the temperature sensor 3.1, the first trip element AE1 is in thermally conductive contact with the gas mixture to be monitored, and through the use of the pressure sensor 3.2, the second trip element AE2 is in pressure-transmitting contact with the gas mixture to be monitored, as will be explained in further detail in conjunction with FIGS. 3-7. The third trip element AE3, to which the magnetic field-dependent sensor 3.3, the contact path 2.3, and the action arrow f3 belong, is a function testing device, which will also be described below. However, as mentioned initially above, it would also be possible to provide one further non-illustrated trip element, which responds to some other physical variable, such as the $H_2$ concentration in the gas mixture to be monitored.

c) The at least two trip elements AE1 and AE2 are connected in such a way that the discharging of the energy storage device or battery 1 into the spark igniter 6 is brought about if only one of the trip elements AE1 or AE2 responds. During an accident, which may extend over a relatively long period of three to five days, for example, ignition sparks are created at the spark igniter 6, and they are repeated at intervals during this period. Accordingly, the trip elements AE1, AE2 are linked to one another in the manner of an OR condition. In other words, their contact paths 2.1 and 2.2 are connected parallel to one another. As noted, the cycling time can amount to several minutes in particular, because after a volume of hydrogen has been combusted, a certain amount of time passes until an ignitable mixture is again present.

FIGS. 3-7 show the mechanical-electrical structure of the ignition sources of FIGS. 1 and 2. A pressure-proof encapsulation for the metal housing 9 is constructed as a pressure-proof steel hood 9.1, which has an annular flange 9.2 in the vicinity of the lower hood opening. A solid bottom plate 9.3, which is formed of corrosion-proof steel like the parts 9.1 and 9.2, is flanged to this annular flange 9.2 in a pressure-proof manner. At least one O-ring 14 is introduced between the annular flange 9.2 and the bottom plate 9.3 and is accommodated by a corresponding annular groove 15. In the illustrated compressed state of the elements 9.2, 9.3, the O-ring has been compressed flat with elastic deformation. Flange screws which are shown at reference numeral 16 have a head 16.1 and a threaded shank at 16.2. One of the associated threaded bores in the bottom plate 9.3 is shown at reference numeral 16.3, and through bores in the annular flange 9.2 are shown at reference numeral 16.4. Only one flange screw 16 is shown in relatively great detail. On the opposite side of the flange connection 9.2-9.3, a flange screw 16 is suggested by means of a center line.

The first trip element AE1 responding as a function of temperature is built into the solid bottom plate 9.3 from its inside. This trip element is in the form of a capsule and is in good thermally conductive contact with the solid bottom plate 9.3. In particular, it is a thermocouple constructed as a so-called thermal switch, having two upwardly protruding contact blades which are shown at reference numerals 17.1 and 17.2. An electric connection between this thermal switch and an ignition electronics component 18, which is potted in a gas-tight manner and is represented by a box drawn in phantom lines, is effected by plug cable, which is not shown for the sake of simplicity. This thermal switch combines a temperature sensor and a contact path in one.

Figure 4:
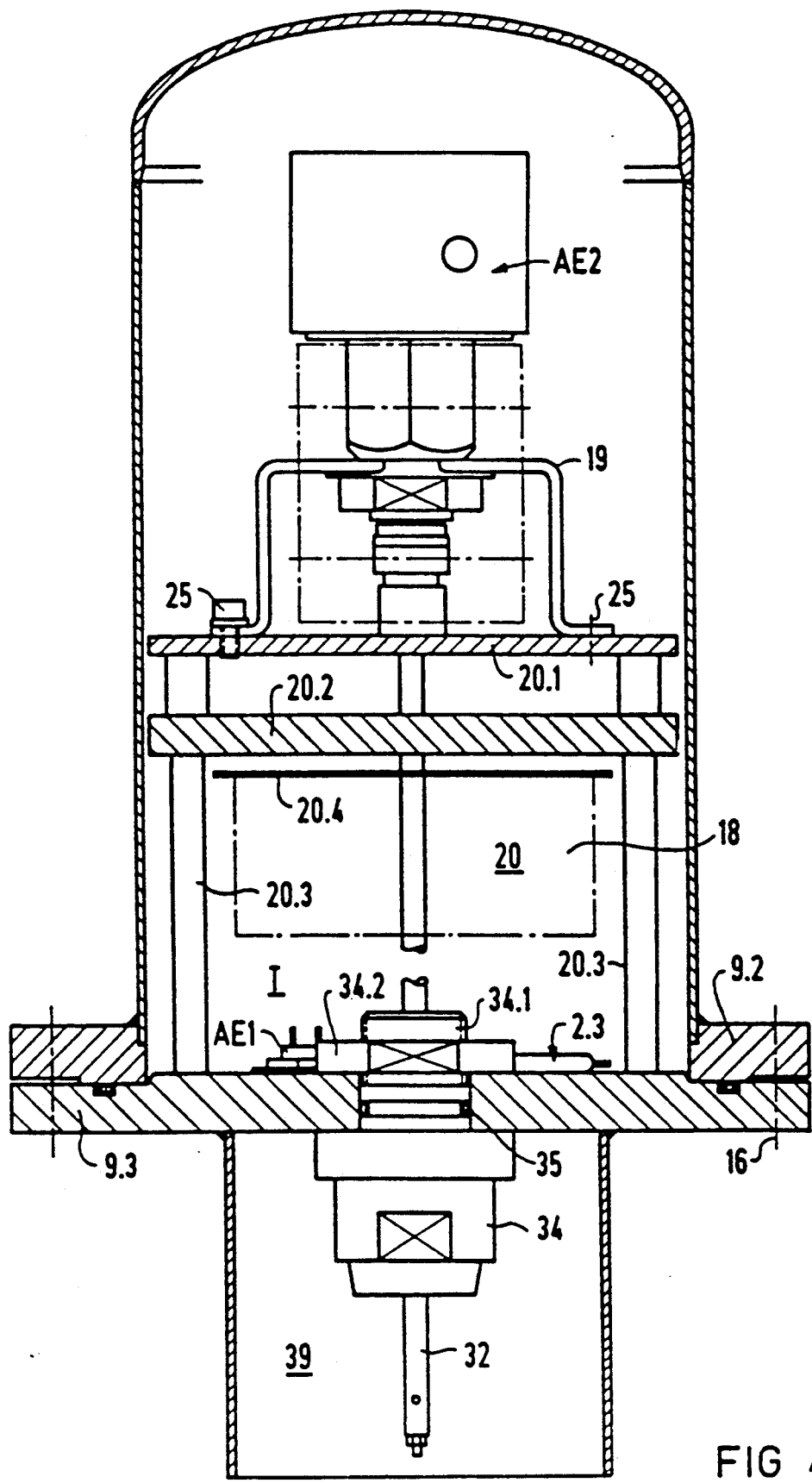
FIG. 4 is a longitudinal-sectional view showing the subject matter of FIG. 3 being rotated by 90°.

The second trip element AE2, which is also seen FIGS. 1 and 2, is the pressure switch, which is firmly fastened to an upper metal table panel 20.1 of a table panel configuration 20 by means of a U-retaining clamp 19 that is also seen in FIG. 4. This table panel configuration 20 is a component of a supporting device T that is secured to the inside of the bottom plate 9.3. Elements of an electric/electronic circuit of the ignition electronics component 18, including a long-term battery configuration 100 and the at least one pressure switch AE2, are secured on this device T. The supporting device T has the aforementioned table panel configuration 20, which is retained on and spaced apart from the bottom plate 9.3 by stay bolts 20.3; a lower table panel 20.2 which is formed of insulating material; and a unit of the ignition electronics component 18 which is carried on the underside thereof. The unit is supported by a support plate 20.4, which is firmly screwed to the insulator plate 20.2 with the interposition of spacer disks 21. One of the screws is shown at reference numeral 22. Through the use of spacer bushings 20.5, the upper metal table panel 20.1 is retained parallel or plane-parallel to the lower table panel 20.2 by the stay bolts 20.3. Retaining nuts 23 and interposed shims 24 protrude upward from the upper table panel 20.1 and are screwed on the threaded ends of the stay bolts 20.3, as is also seen in FIG. 6.

Figure 6:
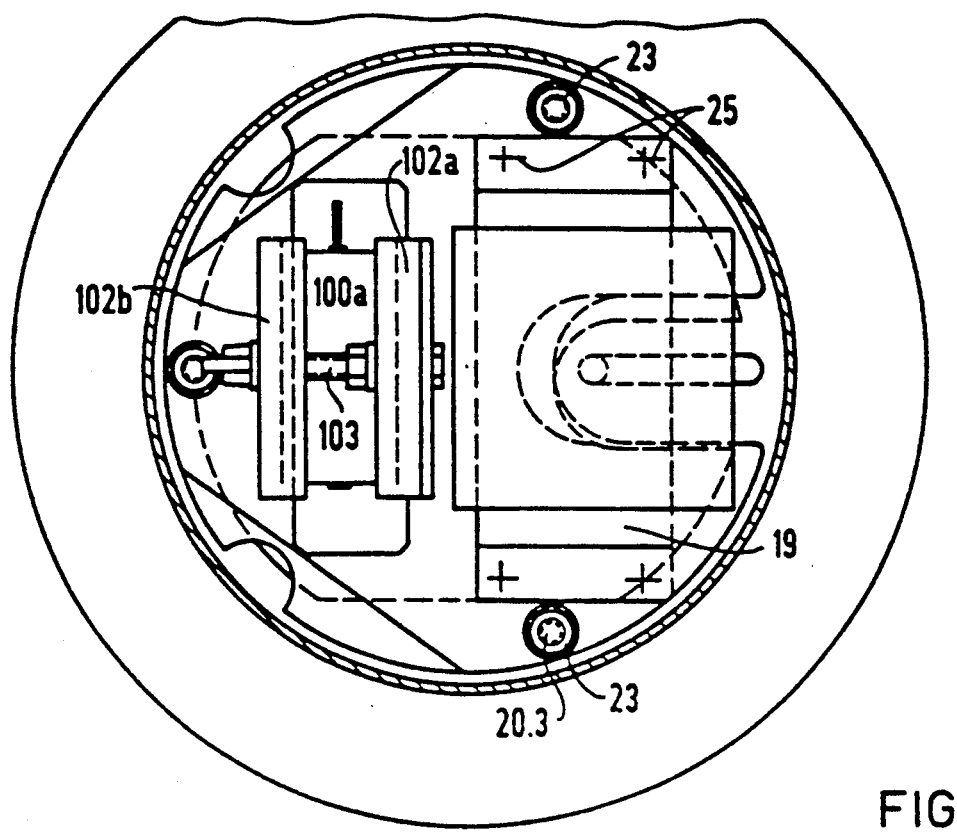
FIG. 6 is a fragmentary, cross-sectional view taken along the line VI—VI of FIG. 3, in the direction of the arrows.

The U-shaped retaining clamp 19 for the pressure switch AE2 is secured to the upper table panel 20.1 with retaining screws 25 seen in FIGS. 4 and 6. A pressure measuring line 26 is passed through the solid bottom plate 9.3 in a pressure-tight manner and is connected to the pressure switch AE2 in a pressure-proof manner by a connection fitting 27. This fitting 27 includes a union nut 27.1, with which a non-illustrated conical mouthpiece is coupled to a correspondingly conically shaped counterpart mouthpiece of a connection line end 27.2 of the pressure switch AE2. A corresponding (standardized) coupling point is located outside the bottom plate 9.3 in an extension of the measuring line 26 and is identified by reference numeral 28. Like the connection end 27.2 of the fitting 27, a connection end 28.2 is solidly attached to the housing and is made polygonal for engagement by monkey wrenches. The other non-illustrated connection end having the conical connection mouthpiece is also connected to the connection end 28.2 in a pressure-proof manner by means of a union nut 28.1. This connection end 28.2 is constructed as a small post, which is sealingly welded to the outside of the bottom plate 9.3 by an annular weld seam 30 and surrounds a through bore 29. The through bore 29 is widened somewhat at the point where an end 26a of the measuring line 26 is introduced, and this end 26a is likewise sealingly welded to the bottom plate 9.3 at an annular weld seam 31.

A portion 26b of the pressure measuring line 26 that protrudes outward terminates at a non-illustrated pressure measuring head, that is located at some suitable point for the pressure measurement. The pressure measuring head may be spaced apart from the housing 9 by a distance ranging from fractions of meters to several meters.

As noted above, the battery configuration 100 is also secured to the upper table panel. An angle element 101 is firmly screwed to the upper table panel 20.1 by one leg 101a, and two retaining jaws 102a and 102b are firmly braced on an upwardly protruding leg 101b by means of a threaded bolt 103, with two battery bodies 100a, 100b being disposed between them. One retaining jaw 102b is slipped onto the threaded bolt 103, which is secured to the leg 101b at one end by a firmly welded retaining nut 104, and it is tightened against the leg 101b by means of a nut 105 and shims 106. Then, once the batteries 100a, 100b have been put into place, the second retaining jaw 102a is slipped onto the free end of the threaded bolt 103 and braced by means of a wing nut 107 and a spring shim 107a. The retaining jaws 102a, 102b are provided with channel-like recesses 108 corresponding to the circumference of the batteries 100a, 100b to be retained therein. The electrical connection lines from the battery 100 and the pressure switch AE2 to the unit of the ignition electronics component 18 are not shown, nor is the connecting cable from the ignition electronics component 18 to a solid pin 32. An end of the solid pin 32 has one ignition electrode 6a of the two ignition electrodes 6a, 6b.

The bottom plate 9.3 is preferably centrally provided with a high-voltage duct HS for the ignition electrode 6a which is at high potential. This electrode 6a is faced by the counter-electrode 6b which is connected to ground potential. The two ignition electrodes 6a, 6b are adjustable with regard to their sparking distance and are retained while being spaced apart from the bottom plate 9.3 on retaining bodies 32, 33. One of these retaining bodies is the aforementioned solid pin 32, which passes centrally and sealingly through a sealingly inserted high-voltage insulator body 34 in the bottom plate 9.3 and has an adjustable receptacle 32.1 for the pin-like or needle-like ignition electrode 6a on the free, downwardly pointing end thereof. The insulator body 34 has a neck portion 34.1 with an O-ring seal 35. The neck portion sealingly penetrates a central bore 9.31 in the bottom plate 9.3 and is braced on the inside of the bottom plate 9.3 by a nut 34.2, likewise including mechanically stable insulating material. In order to provide for the passage of the solid pin 32 through the insulating body 34, so-called metal ceramic connections are available, which are adequately temperature-resistant. In order to lengthen the creepage distance, the insulator body 34 is provided with steps 34.3 and ribs 34.4. The counter-electrode 6b is also retained inside an adjustable receptacle 33.1 on the free end of the stay bolt 33 that is screwed into the underside of the bottom plate 9.3. Both adjustable receptacles 32.1, 33.1 have respective oblique bores 36 formed therein, into which the needle-like ignition electrodes 6a, 6b are thrust, in such a manner that they extend on an incline relative to the horizontal, from their electrode tips facing one another at minimal sparking distance or spacing $a_1$ to their other ends. As a result, any condensed water immediately runs downward and cannot affect the ignition characteristic defined by the sparking distance $a_1$. The adjustable receptacles 32.1 and 33.1 have central bores 37 formed in the end of the pin or body 32 and the bolt or body 33, which intersect with the oblique bores 36. Clamping screws 38 are screwed from the outside into the central bores and likewise have oblique bores formed therein, that are not shown in detail, which are penetrated by the pin-like ignition electrodes 6a and 6b, respectively. Once the clamping screws are tightened, after the ignition electrodes 6a, 6b are threaded-in and their spacing has been adjusted, the ignition electrodes are firmly braced. Non-illustrated check nuts which serve to prevent twisting are seated at the free ends of the clamping screws 38.

Figure 7:
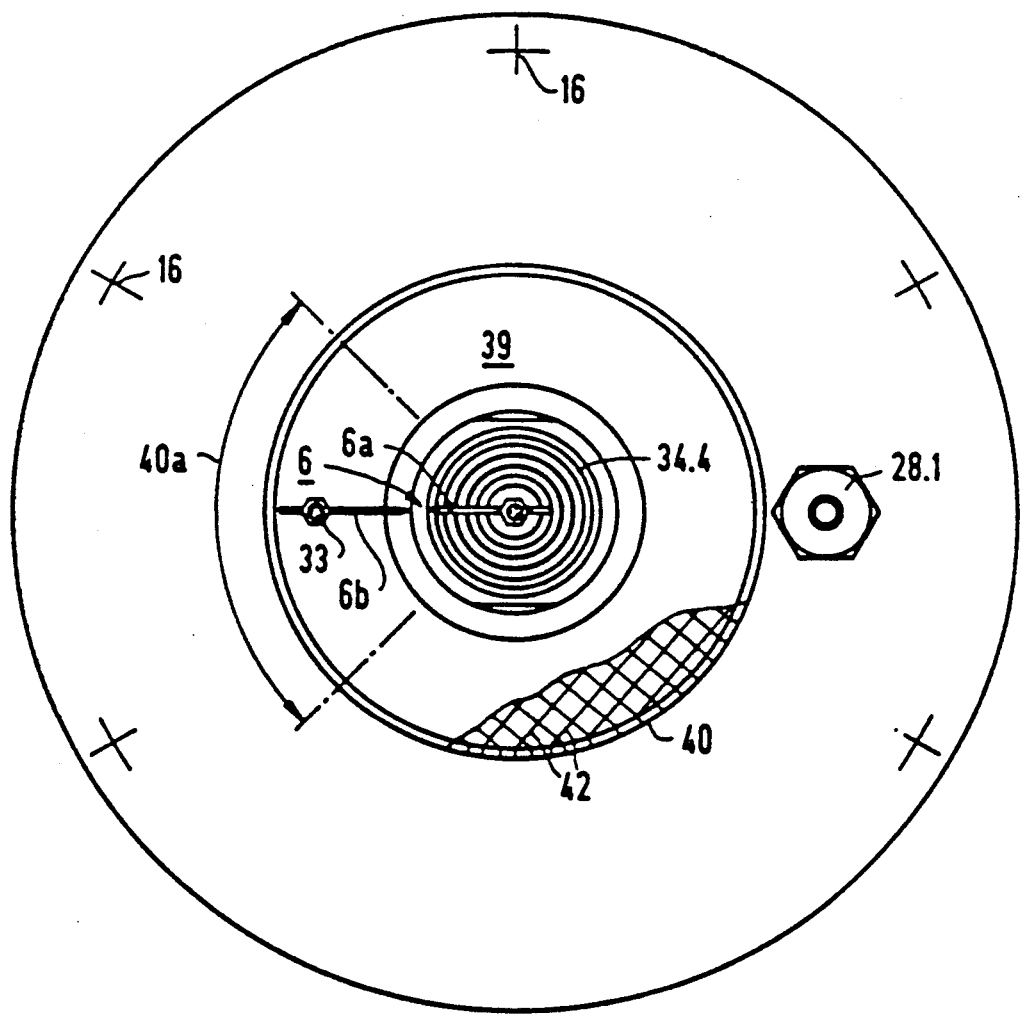
FIG. 7 is a bottom-plan view of the device of FIG. 3.

In order to protect against wind and splashing water, an electrode protection chamber 39 directly surrounding the ignition electrodes 6a, 6b is surrounded underneath the bottom plate 9.3 by a sheet-metal jacket 40, which is also seen in FIG. 7. In principle, this sheet-metal jacket 40 may be perforated like a sieve, so that the gas mixture located in the protection chamber 39 reproduces the gas mixture in the containment as accurately as possible. However, for the sake of wind protection for the electric spark igniter 6, perforation of a sector region 40a shown in FIG. 7 has been omitted. In order to protect against its being touched, it is also advantageous to cover the downwardly pointing opening of the sheet-metal jacket 40 with a grid 42 of fireproof insulating material, which is shown as being cut away in FIG. 7.

Figure 5:
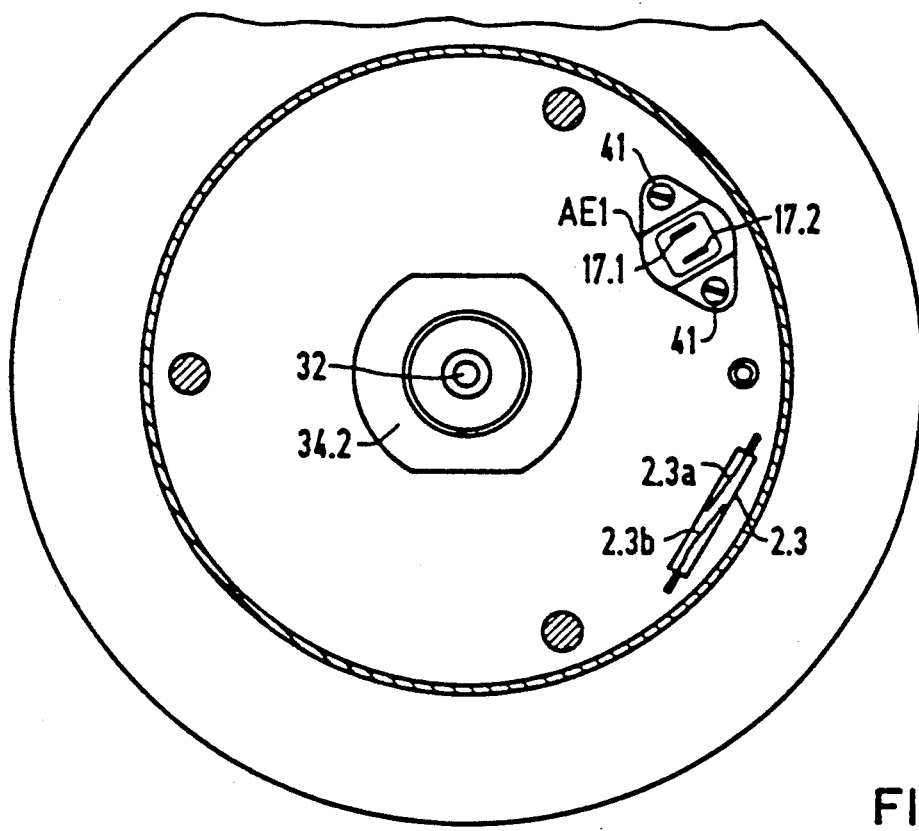
FIG. 5 is a fragmentary, cross-sectional view taken along the line V—V of FIG. 3, in the direction of the arrows.

FIG. 5 is a sectional view showing a glass tubule of the reed contact path 2.3 from above. This contact path is also shown in FIGS. 1 and 2 and forms the third trip element AE3. This trip element is tripped manually by a test magnet. The arrows f3 correspondingly represent the variable analogous to the magnetic force that closes the reed contact path 2.3 when the reed contact path is approached from the outside by a test magnet. It is thus possible to check the function of the dry-cell battery 1 or 100 and the electronic/electric circuit of the ignition electronics component 18, without opening the pressure-proof housing 9. Such checks are performed at regular time intervals, such as daily or weekly. If the check shows that the charge status of the battery configuration 1 or 100 is no longer adequate, the batteries are replaced. Alternatively, the batteries may be rechargeable. The electric supply lines of the reed contact path are not shown, but contact tongues that can be moved magnetically into the closing position are diagrammatically shown at reference numerals 2.3a and 2.3b. FIG. 5 also shows the outline of the housing of the thermal switch AE1, which is constructed similarly to the base of a radio tube and is firmly screwed to the bottom plate 9.3 by means of fastening screws 41.

I claim:

1. Device for controlled combustion of an ignitable hydrogen/air mixture in a gas mixture in a nuclear power plant, comprising:
   a) a spark igniter for tripping an ignition process;
   b) at least one ignition source connected to said spark igniter;
   c) said ignition source having a self-sufficient energy storage device;
   d) said ignition source having at least one first trip element connected between said spark igniter and said energy storage device for responding as a function of temperature to trip the ignition process, and at least one second trip element connected between said spark igniter and said energy storage device for responding as a function of pressure to trip the ignition process, said at least one first trip element being in thermally conductive contact and said at least one second trip element being in pressure-transmitting contact with the gas mixture to be monitored;
   e) said energy storage device discharging to said spark igniter if one of said trip elements responds, and said spark igniter creating ignition sparks being repeated at intervals during an accident extending over a relatively long period of time.

2. Device according to claim 1, wherein said spark igniter has an ignition electrode at relatively high potential and a counter-electrode at ground potential being disposed opposite said ignition electrode, said energy storage device is a long-term battery configuration, and including a pressure-proof housing having a solid bottom plate with inner and outer surfaces, said at least one first trip element being mounted in thermally conductive contact with said inner surface of said bottom plate, said bottom plate having a high-voltage duct formed therein for said ignition electrode, a support device secured to said inner surface of said bottom plate, an electrical/electronic circuit for generating high-voltage ignition sparks if one of said trip elements respond, said electrical/electronic circuit, said long-term battery configuration and said at least one second trip element being secured on said support device, and a pressure measuring line being connected to said at least one second trip element and penetrating said housing in a pressure-proof manner.

3. Device according to claim 2, wherein said ignition electrodes have a sparking distance therebetween, and including retaining bodies on which both of said ignition electrodes are retained for adjusting said sparking distance and spacing said ignition electrodes apart from said bottom plate.

4. Device according to claim 2, wherein said pressure measuring line penetrates said bottom plate.

5. Device according to claim 3, including a high-voltage insulator body being sealingly inserted into said bottom plate, said ignition electrodes having pin or needle-like shapes, said retaining body for said high-voltage ignition electrode being a solid pin centrally penetrating said high-voltage insulator body and having a free downwardly pointing end, and an adjustable receptacle disposed on said free downwardly pointing end for said high-voltage ignition electrode.

6. Device according to claim 5, including a stay bolt being screwed into said lower surface of said bottom plate and having a free end, and an adjustable receptacle disposed on said free end of said stay bolt for retaining said counter-electrode.

7. Device according to claim 2, wherein said sparking distance has a given minimum, and said ignition electrodes are pin or needle-like, have tips facing each other at said given minimum distance, have other ends, and each extend at an incline relative to the horizontal as viewed from said electrode tips to said other ends.

8. Device according to claim 2, including an electrode protection chamber disposed underneath said bottom plate and immediately surrounding said ignition electrodes, and a sheet-metal jacket surrounding said electrode protection chamber for protection against wind and splashing water.

9. Device according to claim 8, wherein said sheet-metal jacket has a downwardly pointing opening formed therein, and a relatively large-mesh grid covering said downwardly pointing opening for shielding against touching while not impairing an ignition process.

10. Device according to claim 9, wherein said grid is formed of a fire-proof insulating material.

11. Device according to claim 1, including a pressure-proof encapsulation for said housing having a pressure-proof steel hood with a hood opening formed therein, and an annular flange disposed in the vicinity of said hood opening and said solid bottom plate, said annular flange and said bottom plate being flanged together in a pressure-proof manner.

12. Device according to claim 1, including a third trip element for responding magnetically to discharge said energy storage device to said spark igniter.

13. Device according to claim 12, wherein said energy storage device is a battery, said trip elements have contact paths, and including a reed contact path being connected electrically parallel to said contact paths, said reed contact path having a tubule disposed on said inner surface of said bottom plate for checking functioning of said at least one ignition source and charge status of said battery from the outside by magnet-actuated closure of said reed contact path.

14. Device according to claim 2, wherein said supporting apparatus has stay bolts, a table panel configuration retained on and spaced apart from said bottom plate by said stay bolts, a lower table panel being formed of insulating material and having a lower surface, said electrical/electronic circuit having a structural unit secured on said lower surface of said lower table panel, and an upper table panel formed of metal on which said battery configuration and said at least one second trip element are secured.

15. Device for controlled combustion of an ignitable hydrogen/air mixture in a gas mixture in a containment of a nuclear power plant, comprising:
   a) a spark igniter for tripping an ignition process;
   b) at least one ignition source connected to said spark igniter;
   c) said ignition source having a self-sufficient energy storage device;

d) said ignition source having at least one first trip element connected between said spark igniter and said energy storage device for responding as a function of temperature to trip the ignition process, and at least one second trip element connected between said spark igniter and said energy storage device for responding as a function of pressure to trip the ignition process, said at least one first trip element being in thermally conductive contact and said at least one second trip element being in pressure-transmitting contact with the gas mixture to be monitored;

e) said energy storage device discharging to said spark igniter if one of said trip elements responds, and said spark igniter creating ignition sparks being repeated at intervals during if required over a relatively long period of time.

* * * * *